Feb. 11, 1930.   F. M. ASHLEY   1,746,758
FOUNTAIN PEN
Filed Dec. 1, 1928
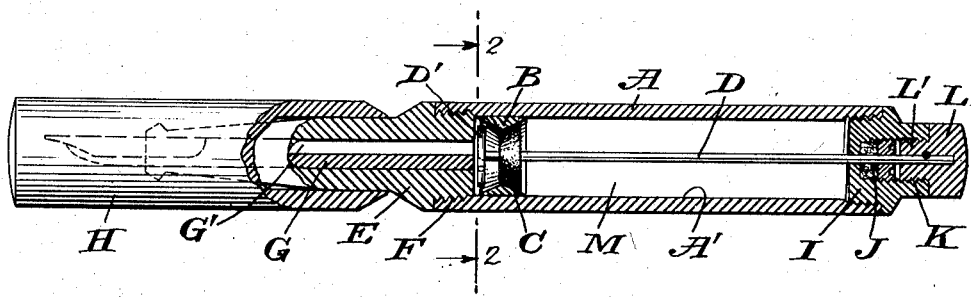
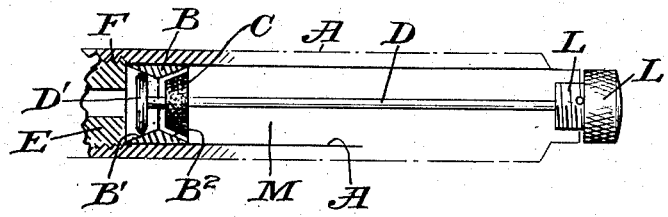
INVENTOR
Frank M. Ashley Patented Feb. 11, 1930

1,746,758

UNITED STATES PATENT OFFICE

FRANK M. ASHLEY, OF BROOKLYN, NEW YORK

FOUNTAIN PEN

Application filed December 1, 1928. Serial No. 322,995.

My invention relates to fountain pens.

The object of my invention is to provide a self filling fountain pen having a two part piston made of resilient material, which permits a pen of this type to be made with a reservoir of small diameter.

A further object is to provide a piston which will conform to variations in diameter of form of the cylindrical bore which forms the inner wall of the reservoir of the pen, to insure perfect filling of the reservoir.

A further object is to provide a construction in which the piston serves to close the reservoir, when desired, and thus prevent ink from flowing from the reservoir.

Referring to the drawings which form a part of this specification;

Fig. 1 is a longitudinal sectional view of a pen embodying my invention, showing the piston part in closed relation.

Fig. 2 is a cross sectional view taken on line 2—2 of Figure 1.

Fig. 3 is a longitudinal sectional view showing the piston in its separated or open position.

A— indicates the barrel of the pen, which is preferably made of hard rubber, and A'— indicates the inner cylindrical wall of the barrel, and should be made smooth and of the same diameter throughout its length, which is usually accomplished by moulding the barrel over a smooth mandrel.

Rubber and other substances used in making the barrels of fountain pens, are apt to become distorted at times, due to carelessness in moulding, or by pressure against the barrels after moulding, sufficient to slightly change the true cylindrical form of the wall, and therefore when a piston is fitted to a true part of the wall and is moved to a distorted portion thereof, the piston sticks, or if made small enough to pass the distorted part, it loses its fluid tight relation with the wall, and will thus prevent perfect filling of the reservoir.

The present construction of piston is made in such a way as to change its form enough to conform to such slight changes of form in the wall, and to maintain a tight sliding relation between the piston and the wall A'.

B— indicates the ring portion of the piston and C— the valve portion. D— indicates the piston rod, which is preferably made of Monel metal, but may be made of hard rubber or other suitable material capable of resisting the acids of a writing fluid. The valve portion C— is fitted tight on the piston rod. The end of the piston rod adjacent the piston, is bent into a spiral form, as illustrated at D'— in Figure 2, and serves to abut the ring B— and move the same to the rear end of the wall on the outward stroke of the piston, at which time the piston is in its open condition, as shown in Figure 3. The ring portion of the piston may be made of hard vulcanized rubber, and the valve portion of soft vulcanized rubber, or vice versa. The inner surface of the ring is preferably formed with oppositely disposed conical surfaces B'— and B²— as shown, the surface B²— conforming to the shape of the surface of the valve portion C. The best angles are from 30 to 45 degrees. When using hard rubber for the ring portion, I prefer to use an angle of 30 degrees for the co-acting surfaces between the ring and valve portion, and 45 degrees when using soft rubber for the ring portion; however, any angle between 45 and 30 degrees will operate and function as hereinafter set forth.

E— indicates the pen section, which is connected to the barrel A— by a screw thread F— in the usual manner.

G— indicates the feed plug and G'— the feed duct formed therein, and H— the pen cap.

I— indicates the end plug and J— the stuffing box therein.

The end plug is provided with a thread K— to receive the threaded end L'— of the handle L— connected to the piston rod D— and also to hold the packing nut.

It will be observed that the piston rod D— may be made of metal rod of small diameter, which will have very little friction generated in its movement thru the stuffing box.

In making a pen having a reservoir of small diameter, say one quarter of an inch, the parts of the piston become small in size, and a piston having many parts, including separate packing material, is difficult to make, and from a commercial manufacturing standpoint, entirely impractical.

In the present construction, the ring B— will be thin and flexible, whether made of hard or soft material, such as vulcanized rubber, and as it bends in conforming to any change in the form of the cylinder A'— the valve portion C— will yield and conform to the changed form of the co-acting conical surface B²— and maintain a fluid tight sliding joint, since both parts will yield if the valve portion C— is made of soft rubber. If the ring portion is made of soft rubber, the valve portion may be made of either hard or soft rubber, as desired. It will be noted that the valve portion is of less diameter than that of the reservoir, so that the ink may flow around it and pass thru the ring portion to feed the pen, and also in the act of filling the reservoir.

The operation of filling the reservoir is simple.

Assuming the piston to be closed as shown in Figure 1, the handle L— is unscrewed from the thread K—, which action opens the piston by moving the valve portion from the ring, and causes the spiral end portion D'— of the rod D— to abut the ring portion B— when the piston as a whole is drawn to the upper end of the reservoir M—, any air or ink therein passing thru the ring and between the coil of the spiral end D'— to the lower side of the piston.

The pen point is then submerged in the ink receptacle, and the piston rod forced inwardly, causing the valve portion C— to abut the conical surface B²— of the ring portion B— and hold it firmly against the wall of the reservoir as the piston moves downward to the end of its stroke.

As the piston moves downward to the end of its stroke, a rarefaction of air takes place behind the piston, causing the ring portion of the piston to be pressed against the cylinder wall, due to the relatively increased pressure of the atmosphere on the inner wall of the ring portion, while all air and ink on the lower side of the piston is forced out into the receptacle, where the air escapes thru the ink therein.

As soon as the piston has reached the end of its stroke, and pressure is removed from the piston rod, the valve portion C— is instantly drawn upward by the suction of the rarefied atmosphere above the piston, and ink from the receptacle is drawn into the reservoir, flowing thru the piston between the ring and valve portion, as will be readily understood.

By screwing the handle into the end plug, the valve portion will abut the ring portion and close the reservoir.

By unscrewing the handle a limited distance, the valve portion is moved from the ring, which opens the reservoir and permits ink to flow therefrom thru the piston to the pen point.

Having thus described my invention, I claim as new:

1. A fountain pen having a barrel with a smooth cylindrical wall formed therein, a piston rod, a piston movable by said rod comprising a thin flexible resilient ring fitted to slide in contact with said wall, and a valve portion fixed to said rod at its inner end and adapted to reciprocate and abut said ring and press it against said wall during the filling stroke of the piston.

2. A fountain pen having a barrel with a smooth cylindrical wall formed therein, a piston rod, a piston movable by said rod comprising a thin flexible ring fitted to slide in contact with said wall, and having a conical shaped inner surface, and a valve portion fixed to said rod at its inner end and adapted to reciprocate and abut said conical surface of said ring and press the ring against said wall during the filling stroke of the piston.

3. A fountain pen having a barrel with a smooth cylindrical wall formed therein, a piston rod, a piston movable by said rod comprising a thin flexible ring fitted to slide in contact with said wall, and a valve portion fixed to said rod at its inner end and adapted to abut said ring and press it against said wall during the filling stroke of the piston; one of said parts being made of relatively soft yielding material.

4. A fountain pen having a barrel with a smooth cylindrical wall formed therein, a piston rod, a piston movable by said rod comprising a thin ring fitted to slide in contact with said wall in fluid tight relation therewith and a valve portion fixed to said rod at its inner end and adapted to abut said ring and press it against said wall during the filling operation, and an abutment carried by the piston rod to move said ring.

5. A fountain pen having a barrel with a smooth cylindrical wall formed therein, a piston rod having a spiral abutment carried on one end thereof, a piston movable by said rod comprising a ring fitted to slide in contact with said wall in fluid tight relation, and a valve portion fixed to said rod at its inner end and adapted to abut said ring and press it against said wall during the filling stroke of the piston.

In testimony whereof I have affixed my signature.

FRANK M. ASHLEY.